United States Patent
Dietz et al.

(10) Patent No.: US 9,843,926 B2
(45) Date of Patent: Dec. 12, 2017

(54) SYSTEM AND METHOD FOR PREVENTING AN ATTACK ON A NETWORKED VEHICLE

(75) Inventors: Roland Dietz, Feldkirchen (DE); Rainer Falk, Poing (DE); Hans-Joachim Hof, Ingolstadt (DE); Franz Stadler, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 509 days.

(21) Appl. No.: 13/580,658

(22) PCT Filed: Feb. 17, 2011

(86) PCT No.: PCT/EP2011/052362
§ 371 (c)(1),
(2), (4) Date: Dec. 20, 2012

(87) PCT Pub. No.: WO2011/101414
PCT Pub. Date: Aug. 25, 2011

(65) Prior Publication Data
US 2013/0104186 A1    Apr. 25, 2013

(30) Foreign Application Priority Data
Feb. 22, 2010    (DE) .......................... 10 2010 008 816

(51) Int. Cl.
*H04L 29/06* (2006.01)
*H04W 12/02* (2009.01)
(Continued)

(52) U.S. Cl.
CPC ............. *H04W 12/02* (2013.01); *H04L 63/10* (2013.01); *H04L 63/14* (2013.01); *H04W 12/12* (2013.01); *H04L 67/12* (2013.01); *H04W 12/08* (2013.01)

(58) Field of Classification Search
None
See application file for complete search history.

(56) References Cited

U.S. PATENT DOCUMENTS 6,144,859 A * 11/2000 LaDue ................ G07C 9/00111
455/403
6,282,495 B1 * 8/2001 Kirkhart ................ G01C 21/26
342/175

(Continued)

FOREIGN PATENT DOCUMENTS

| CN | 101199183 | 6/2008 |
| CN | 101262333 | 9/2008 |

(Continued)

*Primary Examiner* — Maung Lwin
(74) *Attorney, Agent, or Firm* — Cozen O'Connor (57) ABSTRACT

A system for preventing an attack on a networked vehicle via a wireless communication device including a wireless data traffic network, a security status determination unit for controlling access to the wireless network depending on a security status based on evaluation of a configuration and/or on log data of the vehicle and/or on time that has passed since a software update, and a communication device and an access control device. A method for preventing an attack on a networked vehicle via a wireless communication device, where a security status is determined based on an evaluation of a current configuration of the vehicle and/or on log data of the vehicle and/or on time that has passed since an update of relevant software a network access rule set is determined and actuated for the access to the data traffic network based on the determined security status.

15 Claims, 8 Drawing Sheets (51) Int. Cl.
*H04W 12/12* (2009.01)
*H04W 12/08* (2009.01)
*H04L 29/08* (2006.01)

(56) References Cited

U.S. PATENT DOCUMENTS

| | | | |
|---|---|---|---|
| 6,389,337 B1* | 5/2002 | Kolls | B60R 25/04 340/439 |
| 6,647,270 B1* | 11/2003 | Himmelstein | G06Q 10/10 342/352 |
| 6,717,508 B2* | 4/2004 | Sashida | B60R 25/33 307/10.2 |
| 7,716,726 B2 | 5/2010 | Phillips et al. | |
| 7,928,829 B2* | 4/2011 | Hermann | B60R 25/24 340/5.2 |
| 8,150,563 B2* | 4/2012 | Georgi | B60R 25/245 180/168 |
| 2004/0160304 A1* | 8/2004 | Mosgrove | B60R 25/23 340/5.21 |
| 2004/0263316 A1* | 12/2004 | Dix | B60R 25/04 340/5.23 |
| 2005/0023901 A1* | 2/2005 | Ghabra | B60R 25/2063 307/10.5 |
| 2005/0096809 A1* | 5/2005 | Skeen | G07C 5/008 701/31.4 |
| 2005/0183138 A1* | 8/2005 | Phillips et al. | 726/11 |
| 2006/0019720 A1* | 1/2006 | Kakehi | H04M 1/6091 455/569.2 |
| 2006/0224305 A1* | 10/2006 | Ansari | G08C 17/00 701/533 |
| 2006/0271248 A1* | 11/2006 | Cosgrove, Jr. | B64C 39/024 701/2 |
| 2008/0027602 A1* | 1/2008 | Yeap | B60R 25/04 701/31.4 |
| 2008/0133938 A1* | 6/2008 | Kocher | G11B 20/00086 713/193 |
| 2008/0219274 A1 | 9/2008 | Kato et al. | |
| 2008/0258880 A1* | 10/2008 | Smith | G08B 21/10 340/286.02 |
| 2009/0031418 A1 | 1/2009 | Matsuda et al. | |
| 2009/0047929 A1 | 2/2009 | Chesnutt et al. | |
| 2009/0167512 A1* | 7/2009 | Iwamoto | B60R 25/1004 340/429 |
| 2009/0212928 A1 | 8/2009 | Aijaz | |
| 2009/0265070 A1* | 10/2009 | Okada | B60W 40/10 701/70 |
| 2009/0300312 A1* | 12/2009 | Handschuh | G06F 12/1408 711/166 |
| 2009/0300365 A1* | 12/2009 | Karmes | G06F 21/125 713/182 |
| 2009/0311995 A1* | 12/2009 | Himmelstein | G06Q 10/10 455/414.1 |
| 2010/0087981 A1* | 4/2010 | Orozco-Perez | 701/30 |
| 2010/0305779 A1* | 12/2010 | Hassan | G01C 17/38 701/2 |

FOREIGN PATENT DOCUMENTS

| | | |
|---|---|---|
| DE | 10 2008 037 130 A1 | 4/2009 |
| EP | 1 564 963 B1 | 9/2007 |
| EP | 1 956 794 | 8/2008 |
| FR | 2 880 225 A1 | 6/2006 |
| WO | WO 01/26338 A2 | 4/2001 |

* cited by examiner

SYSTEM AND METHOD FOR PREVENTING AN ATTACK ON A NETWORKED VEHICLE

CROSS REFERENCE TO PRIOR APPLICATIONS

This is a U.S. national stage of application No. PCT/EP2011/052362, filed on 17 Feb. 2011. Priority is claimed on German Application No. 10 2010 008 816.1, filed 22 Feb. 2010, the content of which is incorporated here by reference.

BACKGROUND OF THE INVENTION

1. Field of the Invention

The invention relates to a system for preventing an attack on a networked vehicle via a wireless communication device of a vehicle and to a corresponding method.

2. Related Art

Vehicles are changing to become more complex systems that can load different types of content, e.g. current weather and traffic data, music, films, point-of-interest information, software updates, or remote diagnostics via one or more wireless links from one or more data networks.

For the wireless linkage, a communication interface (communication box, ComBox) can be installed in vehicles, which supports one or more radio standards (e.g. GSM/GPRS, EDGE, UMTS, HSDPA, LTE, WLAN, WiMAX, . . . ). Thus, the vehicle, or components of the vehicle, respectively, such as an infotainment system, can communicate with infrastructure servers of other vehicles (car-2-car communication) or radio beacons (roadside units) erected at the edge of the road, and load contents from these.

Vehicles are opened by this wireless communication towards the untrustworthy outside world and thus also exposed to attacks via the communication interface.

Networked vehicles therefore need protective measures that prevent attacks on the vehicle via the communication interface.

From the prior art, devices are known that receive connections from the outside, forward them to internal control devices, can perform cryptographic communication, and are programmable from the outside.

When data is called up out of the vehicle, these devices are not, however, suitable for offering protection.

Furthermore, systems are known that determine an update status online. However, these systems determine an update status only after a connection has already been set up and, in principle, are not suitable for preventing access to contents from outside the vehicle before the update status has been checked.

SUMMARY OF THE INVENTION

It is an object of one embodiment of the present invention to provide a system and a method suitable for preventing an attack on a networked vehicle via a wireless communication device and, in doing so, eliminating one or more disadvantages from the prior art.

According to one embodiment of the invention, a system for preventing an attack on a networked vehicle via a wireless communication device of a vehicle is provided.

This system comprises a wireless data traffic network, a security status determination unit for controlling the access to the wireless data traffic network based in part on a security status determined, the security status being based on an evaluation of a current configuration of the vehicle and/or on log data of the vehicle and/or on an elapsed time since an update of relevant software. Furthermore, the system has a communication device suitable for connection to the wireless data traffic network and an access control device for controlling the network access to the wireless data traffic network, which can be connected to the security status determination unit.

One embodiment of the invention relates to a method for a system for preventing an attack on a networked vehicle via a wireless communication device of a vehicle. A security status is determined based on an evaluation of a current configuration of the vehicle and/or of log data of the vehicle and/or on an elapsed time since an update of relevant software. Furthermore, the method consists of the determination of a network access policy for access to the data traffic network on the basis of the security status determined, which is subsequently activated.

BRIEF DESCRIPTION OF THE DRAWINGS

In the text which follows the invention will be explained in an exemplary manner by means of the drawing. However, the invention is not restricted to the exemplary embodiment shown. In these figures:

FIG. 5 is a flowchart of a method according to the invention corresponding to a third embodiment;

DETAILED DESCRIPTION OF THE PREFERRED EMBODIMENTS

Figure 1:
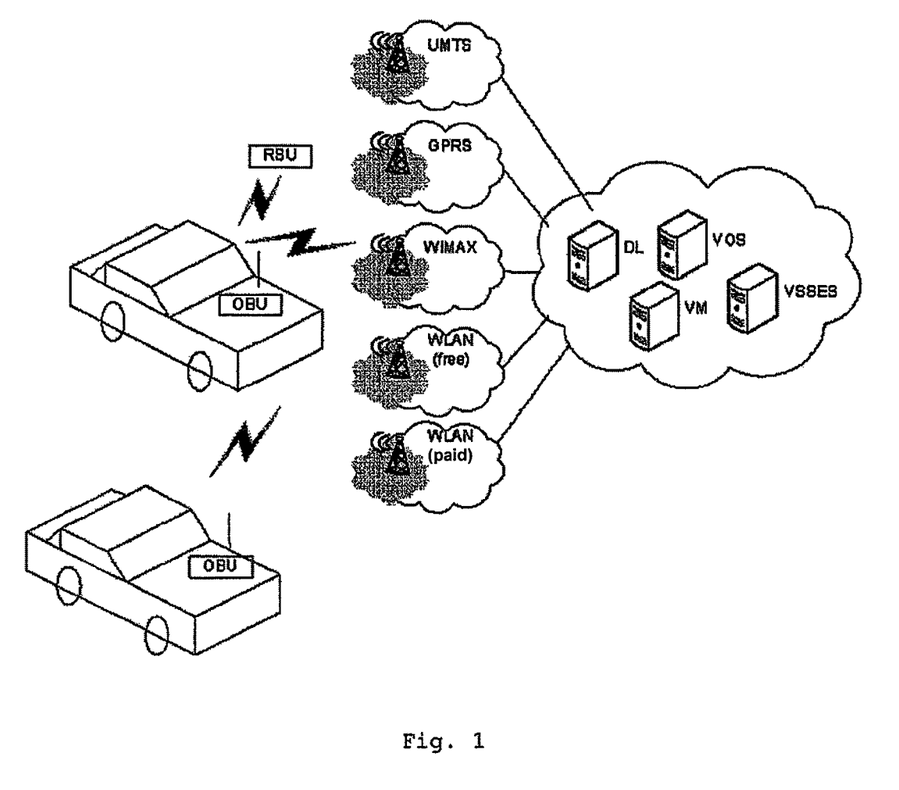
FIG. 1 is a diagram of an embodiment of a system according to the invention.

FIG. 1 shows a vehicle that has an on-board unit (OBU), which can communicate via a communication device using different mobile radio systems, e.g. UMTS, LTE, GPRS, WiMAX, WLan, with infrastructure servers in an exemplary data network.

An exemplary infrastructure server can be a download server (DL) that offers downloads, e.g. for music.

Another infrastructure server can be a vehicle management server (VM) that configures and monitors the vehicle, e.g. for diagnosis or for installing software updates.

Yet another infrastructure server can be a vehicle online services server (VOS) that provides online services, e.g. current weather and traffic information.

Furthermore, a vehicle security status evaluation server (VSSES) can be provided that provides information about its security status to a vehicle.

In addition, the vehicle or the OBU, respectively, can communicate with other vehicles or OBUs via car-2-car communication (C2C) or with a permanently installed roadside unit (RSU).

Figure 2:
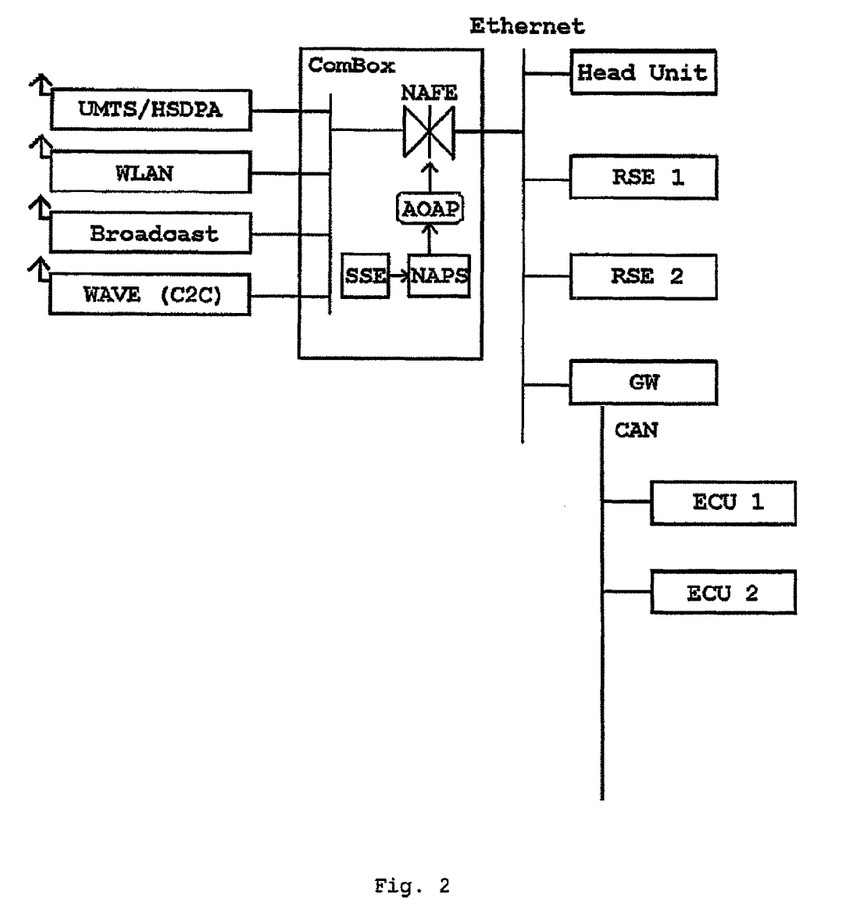
FIG. 2 is an arrangement of components according to one embodiment of the invention related to a vehicle-internal bus system.

FIG. 2 is a section of a possible arrangement of components according to one embodiment of the invention related to a vehicle-internal bus system.

Transmitting/receiving units are connected to an exemplary communication device (ComBox) to be able to use different radio systems (UMTS, HSDPA, WLAN, Broadcast, WAVE (C2C)).

An infotainment system is connected via an exemplary Ethernet vehicle bus to an exemplary head unit and by way of example to two units for the rear seats, so-called rear seat entertainment (RSE1, RSE2). Instead of Ethernet Flexray, or any other suitable bus could be used.

Two control units ECU1, ECU2, which can communicate via another protocol, e.g. the CAN protocol, are connected via a gateway (GW).

The ComBox can have a network access enforcement engine (NAEE) that restricts or influences the communication between "outside" and "inside". This occurs in accordance with a current network access policy (AOAP—Active OTA Access Policy). This network access policy (AOAP) is selected or defined, respectively, by a network access policy selection function (NAPS) which can depend on the result of the security self-evaluation (SSE). Furthermore, the network access policy can also depend on other parameters.

The ComBox can contain a network access policy enforcement unit which restricts or influences, respectively, the network traffic from/to "outside" i.e. to the transmitting/receiving units. The ComBox can perform an evaluation of the security status and can determine a security policy which it can activate and enforce. Furthermore, it can also optionally change the configuration of network communication filters (firewall functions) of further components of the vehicle via a control command. In particular, it can change a network communication filter of the gateway (GW) of a unit of the infotainment system (Head Unit, RSB1, RSE2) or of a radio module correspondingly.

Figure 3:
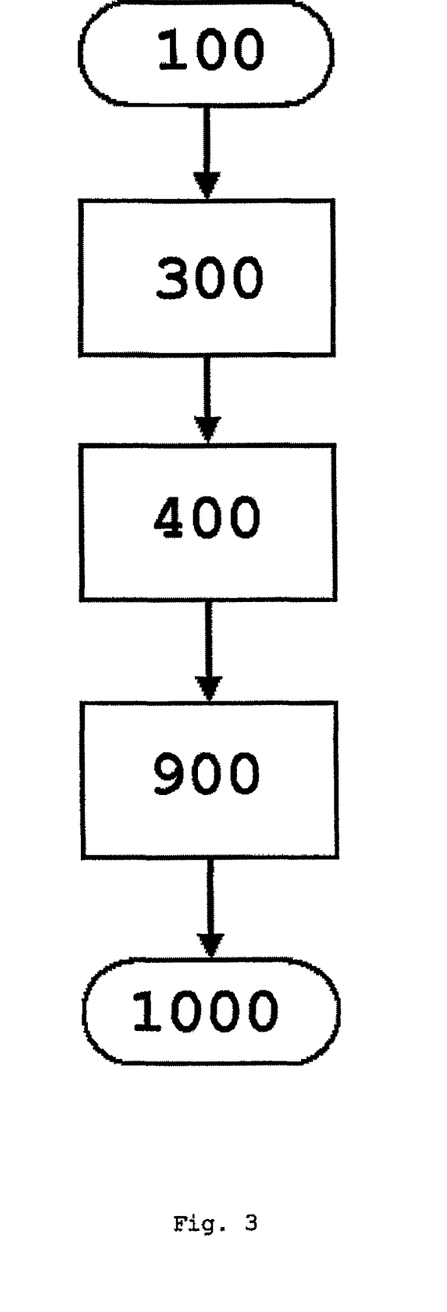
FIG. 3 is a flowchart of a method according to one embodiment of the invention corresponding to a first embodiment.

FIG. 3 is a flowchart for a method according to one embodiment of the invention corresponding to a first embodiment. The method is started in step 100. The sequence of the method can be started by numerous events. Thus, it can be provided that the method is started when the ignition is switched on, when the vehicle engine is started, when the infotainment system is switched on/activated, when a connection is set up (activation of the ComBox) or also after a change in configuration/software update or also regularly, e.g. time-controlled (e.g. every hour).

Subsequently, a current vehicle security status is determined in a step 300. On the basis of the determined vehicle security status, a network access policy is determined in step 400, which is activated in step 900. Subsequently, the method is terminated in step 1000.

In the method described above, all steps can be executed automatically in the vehicle and arranged correspondingly in the ComBox or the OBU, respectively.

This makes it possible that the security is checked even before a communication is set up and thus before a potential source of danger is contacted, and, communication is not permitted in the case of doubt.

In a preferred embodiment, a network access policy "ZERO"/"CLOSED"/"DENY ALL" can be activated immediately after the start in step 100 in a step 200, shown in FIG. 5, in order to prevent any OTA communication before the activation of the network access policy determined in step 300.

Figure 4:
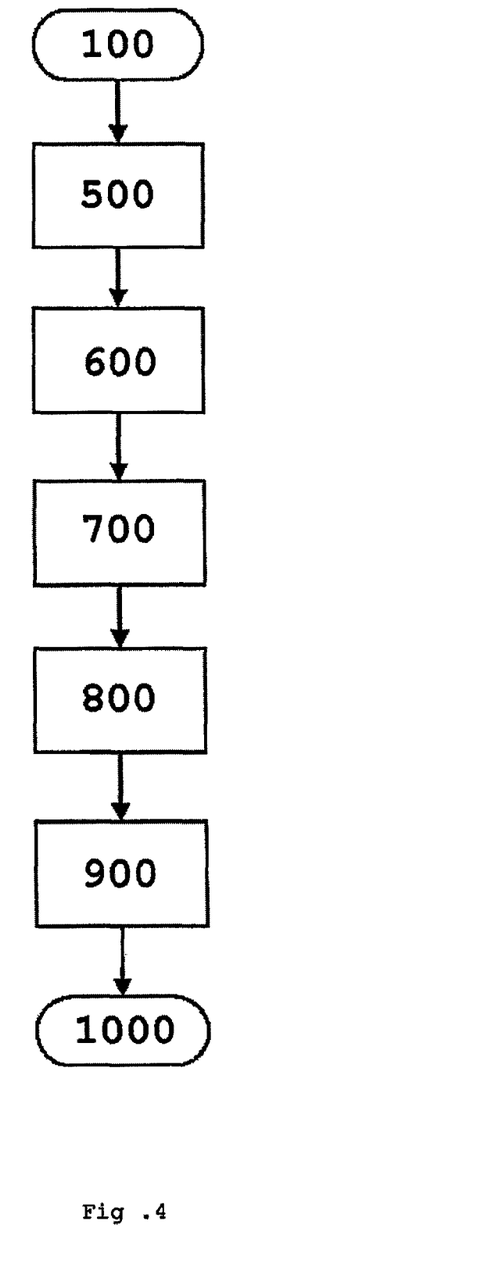
FIG. 4 is a flowchart of a method method according to the invention corresponding to a second embodiment.

FIG. 4 is a flowchart of a method according to one embodiment of the invention. The method is started here in step 100.

In a step 500, an initial network access policy is activated. After that, the current configuration of the vehicle and/or log data of the vehicle and/or the elapsed time since an update of a relevant software is/are transmitted to an evaluation server (VSSES) for determining the security status in a step 600. The result of the determination of the security status is received in step 700 whereupon a suitable network access policy is determined in a step 800. The network access policy determined is then activated in step 900. The method is subsequently terminated in step 1000.

In this variant, an evaluation takes place on an external server. The method can thus be called server-assisted evaluation.

It is only if the local security status check determines a minimum level of security as a result that the server-assisted security evaluation is continued.

FIG. 5 shows yet another exemplary method according to the invention corresponding to a third embodiment. The method is started here in step 100.

Immediately after the start, a network access policy "ZERO"/"CLOSED"/"DENY ALL" can be activated explicitly in step 200 in order to prevent any OTA communication for the present, before the network access policy determined is activated.

Subsequently, the current vehicle security status is determined in a step 300.

On the basis of the determined vehicle security status, it is determined in step 400, whether minimum requirements for the security are met. If the requirements are not met, the method is terminated in step 1000.

Should the minimum requirements be met, the method continues as described before with reference to FIG. 4, i.e. an initial network access policy is activated in a step 500.

After that, current configuration of the vehicle and/or log data of the vehicle and/or an elapsed time since an update of a relevant software are transmitted to an evaluation server (VSSES) for determining the security status in a step 600. The result of the determination of the security status is received in step 700 whereupon a suitable network access policy is determined in a step BOO. The network access policy determined is then activated in step 900. Subsequently, the method is terminated in step 1000.

This embodiment can be called a multi-stage enquiry of the security status where evaluation can proceed autonomously in the vehicle and can be arranged correspondingly in the ComBox or the OBU, respectively, and an evaluation can take place on an external server.

Figure 6:
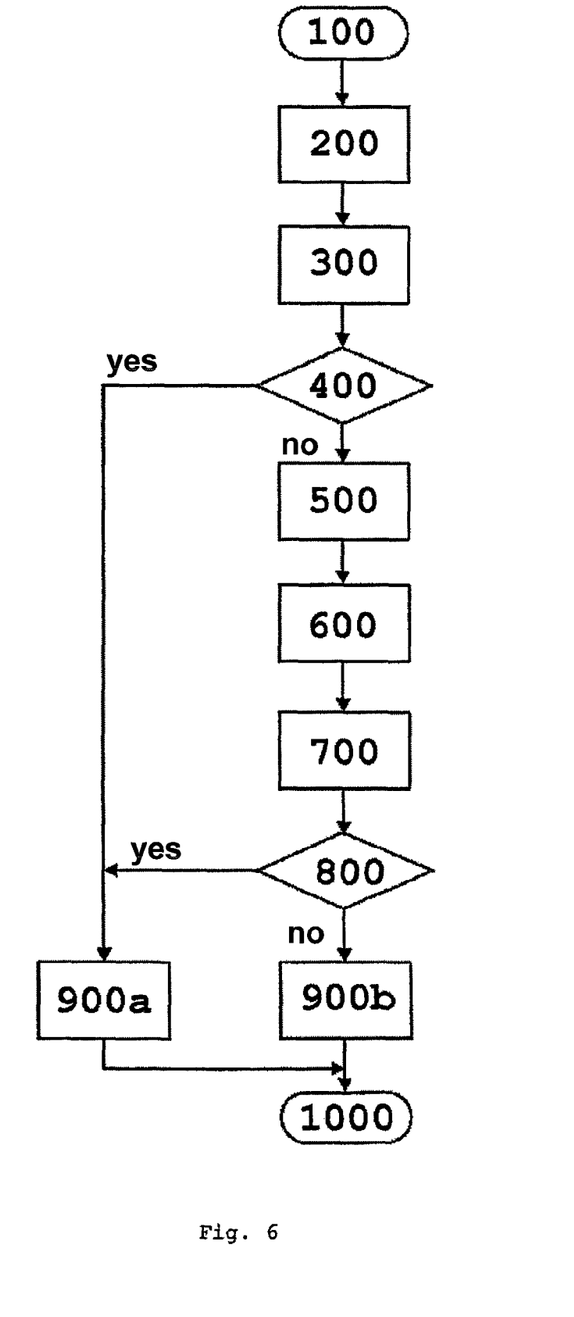
FIG. 6 is a flowchart of a method according to the invention corresponding to a fourth embodiment.

FIG. 6 also shows an exemplary method according to the invention corresponding to a fourth embodiment. The method is started here in step 100.

Immediately after the start, a network access policy "ZERO"/"CLOSED"/"DENY ALL" can be activated explicitly in order to prevent any OTA communication for the present before the network access policy determined is activated.

Subsequently, the current vehicle security status is determined in a step 300.

On the basis of the determined vehicle security status, it is determined in step 400 whether requirements for the security have been met. If the requirements are met, a network access policy is activated in a step 900a which activates the OTA communication. Subsequently, the method is terminated in step 1000.

If, however, it is found in step 400 that the requirements have not been met, a server-assisted evaluation is initiated. This starts by activating an initial network access policy in step 500. After that, the current configuration of the vehicle and/or log data of the vehicle and/or the elapsed time since an update of a relevant software are transmitted to an evaluation server (VSSES) for determining the security status in a step 600. The result of the determination of the security status is received in step 700.

In step 800, it is checked whether the evaluation result received is sufficient, i.e. it is determined which network access policy is activated. If the evaluation result is sufficient for calling the system secure, a network access policy is activated in step 900*a* that activates the OTA communication. Subsequently, the method is terminated in step 1000.

If the evaluation result is not sufficient to call the system secure, a network access policy "ZERO"/"CLOSED"/ "DENY ALL" will be activated explicitly in step 900*b* in order to prevent, any OTA communication for the present before the network access policy determined is activated. Subsequently, the method is terminated in step 1000.

That is to say, the server is only queried if the vehicle itself is "not sure" whether it is in a secure security status.

Figure 7:
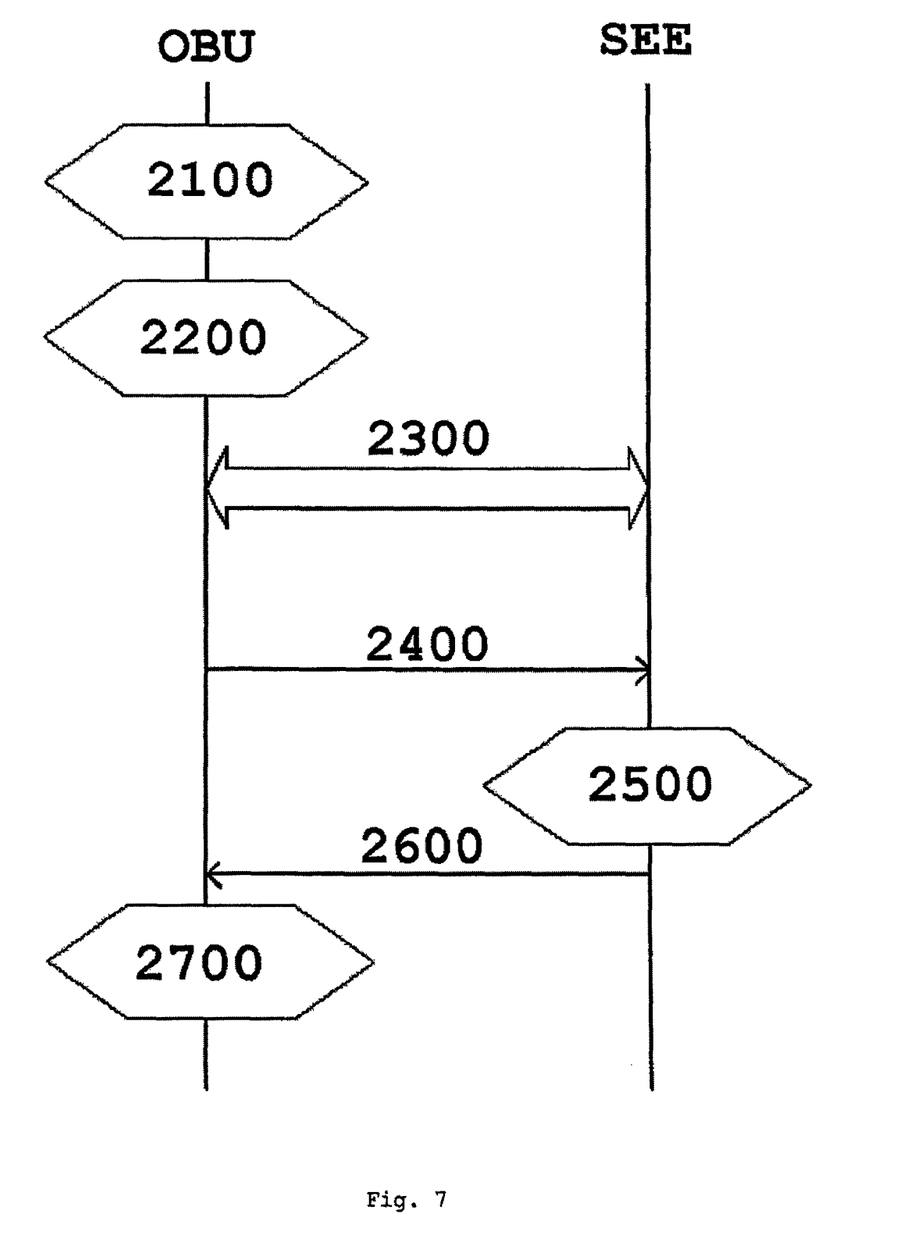
FIG. 7 is a flowchart for message flow according to the invention in accordance with an embodiment of the invention.

FIG. 7 is a message flow diagram according to one embodiment the invention. Here, a vehicle configuration is determined in the vehicle, e.g. in the OBU or a ComBox, in a first step 2100. Subsequently, the communication interface is activated in a further step 2200 in the vehicle. Now, an authentication can take place in a further step 2300 with respect to a VSSES or quite generally with respect to a security status determination unit (SEE). This communication can contain a number of messages that are exchanged between the communication interface and the security status determination unit. After this exchange has taken place, the determination of a security status can be activated in a further step 2400 in that a corresponding request is sent to the SEE. This requirement can already contain a current configuration of the vehicle and/or log data of the vehicle and/or an elapsed time since an update of a relevant software as parameters. Naturally, it is also possible to provide these parameters in one or more separate messages.

The SEE subsequently evaluates a configuration, i.e. a security status, on the basis of the parameters obtained and provides this to the vehicle in a further step 2600.

The vehicle can then activate a corresponding network access policy for access to the data traffic network via a suitable device, e.g. an access control device.

In a further special embodiment, the vehicle configuration information can already be present in the vehicle security status evaluation server (VSSES) or queried by a vehicle manager. In this embodiment, it is not required to transmit the parameters of a current configuration of the vehicle and/or log data of the vehicle and/or an elapsed time since an update of a relevant software but it is sufficient to transmit vehicle identification information instead. This information can be conveyed at the same time as the enquiry or in a separate message to the SEE.

Figure 8:
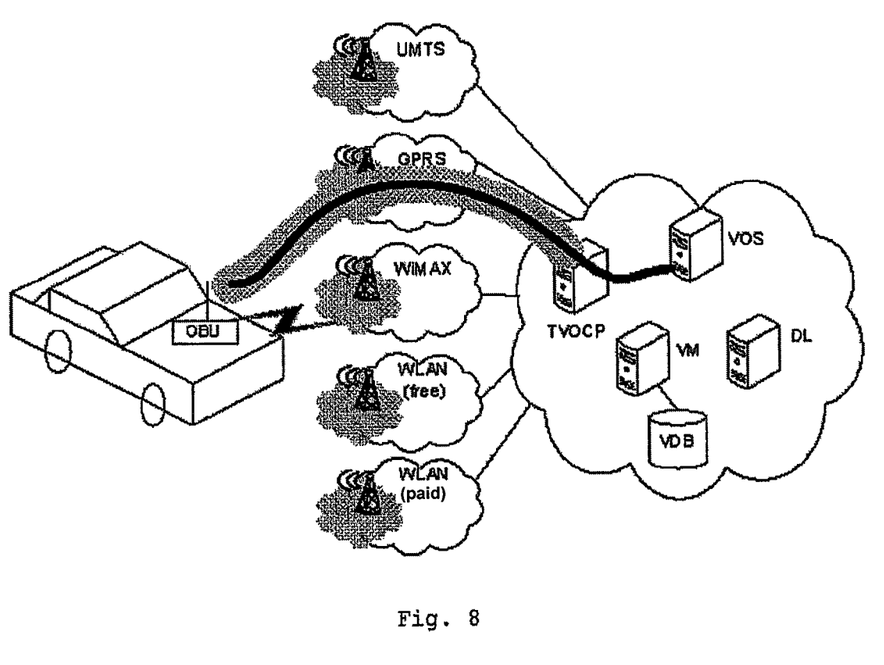
FIG. 8 is a diagram of a system according to one embodiment of the invention.

FIG. 8 is a diagrammatic representation of a further embodiment of a system according to the invention. In this embodiment, it is assumed that a vehicle has an on-board unit OBU that communicates with infrastructure servers via a communication device by using different mobile radio systems.

The vehicle manager VM is typically connected to a vehicle database VDB or has such a one. In this database, configuration information is stored for vehicles administered by the vehicle manager.

In this embodiment, communication or parts of the communication can take place via a Trusted Vehicle Online Communication Proxy (TVOCP). A communication relation (e.g. http) between the vehicle and a vehicle online service (VOS) is shown by a black line. This communication can be tunneled between the vehicle and the TVOCP in that, e.g. a VPN is built up from the vehicle to the TVOCP. In an alternative embodiment, the TVOCP can be implemented as HTTP proxy in the case of HTTP. There does not need to be any tunneling then but HTTP enquiries can also be sent directly from the vehicle to the TVOCP which forwards them—possibly modified—to a destination server, e.g. a VOS. The response to such an enquiry can be correspondingly transmitted from the destination server VOS to the TVOCP which can forward them—possibly modified again—to the vehicle.

When the tunnel is set up, the vehicle can authenticate itself with respect to the TVOCP. The TVOCP can then enquire the current configuration of the vehicle from the vehicle database VDB. This configuration is analyzed in order to determine whether, e.g., current security patches have been installed. Depending on this, a network access policy or a number of network access policies is or are imposed for this vehicle.

It is characterizing that any communication or a part of the communication between the vehicle and a destination server is conducted via the TVOCP so that the data traffic can be examined and potentially hazardous or unwanted communication can be blocked before it reaches the vehicle.

On the basis of the evaluation, e.g. depending on the type of vehicle and the configuration of the vehicle, this TVOCP imposes defined network access policy, i.e. only that communication which is allowed by the defined network access policy is enabled. Other communication is blocked.

The TVOCP obtains the basis for the evaluation in one or more of the following exemplary manners.

Direct transmission from the vehicle (especially vehicle identification/vehicle authentication), e.g. if the vehicle builds up a tunnel to the TVOCP (IPSec, SSL/TLS) and the vehicle authenticates itself. Optionally, the vehicle can transmit further information about itself (manufacturer, construction series, chassis number/VIN, and configuration information).

The information about the vehicle can be retrieved from a database by the TVOCP; in particular, information can be retrieved from a vehicle manager (VM) or from the database (VDB) which is used by the VM in order to store configuration information of a vehicle. In particular, information about the software status of a particular vehicle is available here. Thus, it can be taken into consideration, in particular, whether current software updates (critical security updates) have been installed. If necessary, the VM can be triggered by the TVOCP to enquire the current configuration from the vehicle.

A TVOCP can also actively scan a vehicle to obtain information about the vehicle.

Depending on the above parameters, a network access policy can be determined by the TVOCP which is imposed during the following communication of the vehicle.

If a communication is blocked, a diversion can be optionally effected to another server or the TVOCP responds as a stand-in. For example, an HTTP enquiry of the vehicle can be intercepted by the TVOCP and an HTTP REDIRECT message transmitted to the vehicle that diverts the vehicle client to another HTTP server. There, a web page can be displayed, e.g., in HTML, which informs the driver that the access has been blocked, and why.

Furthermore, the TVOCP can transmit an information item to the vehicle that the vehicle wishes to contact the VM server. This can be done, for example, by inserting a special HTTP header into an HTTP response which is transmitted to the vehicle. By this means, the VM server can then transmit, e.g., available software updates to the vehicle.

Furthermore, the TVOCP can transmit an information item to the VM server that the vehicle is currently online. In the case of due updates, the VM server can initiate a management session with the vehicle, e.g. by sending a trigger SMS message.

Experts can easily see that the aforementioned embodiments can be combined with one another and performed again and separately, e.g. per application or protocol used, wherein different network access policies for different applications and different approaches for determining the security status can exist side by side.

In summary, it can be noted for all exemplary embodiments that it is possible to perform an evaluation autonomously by the vehicle, or the evaluation is supported by a server (server-assisted evaluation), or both aforementioned possibilities are combined.

In the case of an autonomous evaluation, the evaluation function can check the current configuration of the vehicle and/or of the log data and/or of the information about how long ago the last update occurred or when the last check was made for updates or whether impending updates have also been loaded and installed.

Updates can be installed, for example, by a workshop. This can be done, e.g. via a workshop tester which is connected to the vehicle via a diagnostic interface.

As an alternative, updates can also be performed by the user himself, e.g. by means of update medium, e.g. CD/DVD, USB stick, memory card etc., or by loading updates from an update server via the radio communication interface (OTA self-update).

In the case of an OTA self-update, the vehicle communicates with a vehicle management server (VM) to obtain information about updates provided and to load them, if necessary, and install them.

Depending on the evaluation result determined, network access policies can then be determined and these activated for imposition.

For example, two network access policies can be defined (UNRESTRICTED, RESTRICTED). If the result of the evaluation is that the vehicle is in a secure configuration status, e.g. impending security-critical updates have been checked within the last seven days and installed, the network access policy UNRESTRICTED will be activated (provides for, e.g., free, direct internet access). Otherwise, the network access policy RESTRICTED is activated in which it is now only possible to access confidential web services which are offered directly via the vehicle manufacturer.

In the case of an evaluation supported by a server (server-assisted evaluation), the vehicle can transmit parameters to a vehicle security status evaluation server (VSSES) or generally a security-status determination unit (SEE) and is returned an evaluation result as response.

The parameters transmitted can comprise:
identification of the vehicle (e.g. chassis number, vehicle identifier VIN);
vehicle type information (manufacturer, model, year of construction, accessories used);
configuration information (components installed, software status); and
log information (logging dates of the vehicle, also in conjunction with the car key used in each case, especially with respect to OTA communication which can be evaluated on the server).

In particular, it is sufficient to transmit only a vehicle identification information item when information about the current configuration of this vehicle is stored, and can be requested by the VSSES, in a server (VM) in a database (VDS). This is the case, e.g., if the vehicle configuration is administered, e.g., with the aid of the OMA (Open Mobile Alliance) DM protocol OTA. If the information is not stored in a database, the information can be transmitted directly from the vehicle to the VSSES.

The evaluation result can have:
a flag (secure yes/no);
a value (e.g. 0, 1, 2, . . . , 9);
an identifier (policy identifier directly or mapping), security updates provided, possibly with information about their criticality or the functionality affected; and
a network access policy.

Depending on the evaluation result received, the vehicle configures network access policy and imposes the policy.

The Vehicle Security Status Evaluation Server (VSSES) is, for example, a server of the vehicle manufacturer or of a communication provider. Between server and vehicle, an authentication takes place. The communication can be protected, e.g. by means of IPSec-, SSL- or TLS-protocol. The information can take place, e.g., via HTTP, SOAP, OMA DM, SyncML, SNMP.

Although the VSSES is described as an independent unit, it can also be contained in other units. Thus, the VSSES can be, e.g., a part of a VM server which may provide updates.

As already stated, some network access policies can be predefined, e.g.:
UNRESTRICTED: any communication permitted (also directly without a proxy);
UNRESTRICTED INFRASTRUCTURE: any communication with infrastructure services permitted (also directly) but not vehicle-to-vehicle communication;
MANAGED INFRASTRUCTURE: any communication with infrastructure services permitted (also directly), but then only mobile radio networks operated by a known infrastructure operator are used (that is to say, e.g. only GPRS, UMTS/HSDPA via Vodafone, T-Mobile or Orange, but not WLAN);
TUNNEL: tunnel communication to Trusted Gateway (data traffic is tunneled and sent to VPN servers where it can be analyzed and filtered before it is forwarded, e.g., to an Internet server; only tunneled-in data traffic coming from this server will be processed further);
TRUSTED SERVER: only communication with online services offered by a server which is listed in a configured whitelist of the vehicle is possible (e.g. http://*.bmw.de; https://*.bmw.de; http://*.bmw.com; https://*.bmw.com); and
NULL/CLOSED/DENY ALL: no OTA communication possible.

As an alternative or additionally, a network access policy can also be provided by the Vehicle Security Status Evaluation Server (VSSES) or via another server.

It is also possible to define fine grained network access policies: e.g., content filtering can be performed in order to filter contents hazardous for the car. For example, flash content or JavaScripts on websites are only passed if a particular vehicle has loaded the current security patches for the corresponding display programs.

The content of a network access policy can stipulate, e.g. the use of a firewall and of a VPN.

A network access policy consists of rules. These describe which type of network traffic is to be treated in what way, especially whether it (1) is permitted, i.e. processed further and possibly forwarded to the destination controllers in the vehicle (A1-low);
(2) is to be tunneled; encapsulated, i.e. to be transmitted via a VPN tunnel;
(3) is to be detunneled; decapsulated, i.e. unpacking data received via a VPN tunnel before they are processed further or forwarded to the destination controller;
(4) to be discarded.

In addition, certain restrictions can be imposed for permitted data traffic, particularly restrictions with respect to the maximum data rate in order to prevent, e.g., overloading of destination components.

Possible filter criteria comprise:
vehicle: vehicle manufacturer, model, version/year of construction, installed accessories (especially version of the infotainment system installed);
direction (inbound to the vehicle, outbound from the vehicle);
destination component in the vehicle (i.e. the data are forwarded to which controller or come from which controller);
OTA interface (GPRS, UMTS, WLAN, . . . );
current OTA network operator (e.g. T-Mobile, Vodafone, unknown) and country (Germany, France, . . . );
IP address (sender, receiver);
country of origin IP address (certain countries can be blocked);
protocol (e.g. TCP, UDP);
port number;
URL filter;
communication encrypted (e.g. SSL, TLS) or unencrypted;
dedicated filter for known attacks, especially Denial of Service (DoS) (e.g. ping packet with certain length); and
tunneling of the directly received data via Trusted Server.

Apart from pure network communication, network access policies can also relate to content (websites, multimedia files, program code):
usable multimedia formats (e.g., CDs and WAV files could always be replayable whereas MP3 and videos are no longer replayable);
browser plug-ins supported, e.g. for Flash animations;
criteria for allocating online contents (websites) to security zones (a security zone, e.g. in Microsoft Internet Explorer, defines which possibilities web contents of websites of this zone are permitted, e.g. whether utilization of JavaScript is possible). The allocation is carried out by means of the URL from which a website or generally an online content is loaded;
the authorizations associated with a security zone (for online contents); and
authorizations for executed program code: in the prior art, Code Access Security is known, e.g. in Microsoft Common Language Runtime or the Java Runtime Environment. In this context, program code is granted access rights in dependence on its origin (i.e. in dependence on who has signed it or from where it was loaded). It is new that the authorizations allowed by a certain code are set in dependence on the security evaluation; or, respectively, it is defined in dependence on the evaluation result whether a certain code can be executed at all. For example, the execution of Untrusted Code/Downloaded $3^{rd}$ Party Code can be prevented in this manner if the patch status of the vehicle component is not current.

The selected network access policy is preferably imposed by the communication unit of the vehicle. As an alternative, the policy can also be imposed by a separate, preceding security communication unit.

In one variant, filtering of the communication can be additionally carried out vehicle-internally in the on-board network by an access control unit (vehicle bus gateways, controllers). The communication unit or the security communication unit, respectively, can transmit for this purpose an information item about the vehicle security status (indicator, filter rules) to this access control unit by which these adapt their network access policies correspondingly. However, the respective component can also perform the method described individually.

To avoid any blocking, the user should preferably receive a notification to install security patches in time or as soon as possible in order to be able to continue to use all services.

In the case of restricted access, the communication possibilities are restricted and, therefore, not all services may be usable. However, it should preferably still be possible to install required software updates. It can be pointed out to the user that a software update is necessary for a corresponding utilization of service.

By the invention, a vehicle can communicate relatively freely directly as far as this is possible without risk. If, however, attacks are detected or if the protective measures of the vehicle are outmoded or no longer sufficiently effective, hazards, e.g. manipulation of vehicle components by online links, can be avoided by corresponding self-protection measures. If necessary for security reasons, online services are restricted or completely prevented by the said protective mechanisms.

Vehicle components obtain full access to the outside only in the case of a current security update status of the software since they are then capable of repelling the resultant attacks from the network. This ensures reliable vehicle operation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system configured to prevent an attack on a networked vehicle via a wireless communication device of the networked vehicle, comprising:
a wireless data traffic network;
a security status determination unit having a processor and configured to control access to the wireless data traffic network based at least in part on a determined security status,
wherein the determined security status is based at least in part on:
a security self-evaluation of a current configuration of the networked vehicle and, log data of the vehicle comprising at least a vehicle key used, and an elapsed time from a relevant software update, wherein the vehicle key is used to physically access the vehicle;

a hardware transceiver configured to connect to the wireless data traffic network; and an access controller configured to control the access to the wireless data traffic network and connectable to the security status determination unit.

2. The system of claim 1, wherein the security status determination unit is arranged in the networked vehicle and an evaluation of the security status can be performed autonomously.

3. The system of claim 2, wherein the evaluation of the security status comprises:

detecting that a vehicle component of the networked vehicle has detected at least one of an attack and a malfunction of the wireless network access.

4. The system of claim 1, wherein the security status determination unit is arranged in the wireless data traffic network.

5. The system of claim 1, wherein the access controller is arranged in the networked vehicle.

6. The system of claim 1, wherein the access controller is arranged in the wireless data traffic network.

7. The system of claim 1, wherein the wireless network access to the wireless data traffic network is controlled by wireless network access policies, wherein the wireless network access policies for network access to the wireless data traffic network can be selected based at least in part on one or more of a type of connection, a type of filter criteria, and a type of content.

8. The system of claim 7, wherein the control of the wireless network access further comprises specifying whether the wireless network access has to take place in at least one of an encrypted and tunneled manner.

9. The system of claim 1, wherein the basis for the security self-evaluation is one or more of:

a vehicle identification, information about the vehicle comprising one or more of a manufacturer, construction series, chassis number, and vehicle identification number, software status of a the vehicle, whether current software updates have been installed, and whether critical security updates have been installed.

10. The system of claim 9, wherein the basis for the security self-evaluation further comprises a vehicle authentication.

11. A method for preventing an attack on a networked vehicle via a wireless communication device of the networked vehicle in a system having a wireless data traffic network, a security status determination unit, a communication device configured to connect to the wireless data traffic network, and an access control device, the method comprising:

determining a security status, wherein the security status is based at least in part on:

a security self-evaluation of a current configuration of the vehicle and, log data of the vehicle comprising at least a vehicle key used, and an elapsed time from a relevant software update, wherein the vehicle key is used to physically access the vehicle;

determining a network access policy for access to the wireless data traffic network based on the determined security status; and activating the determined network access policy.

12. The method of claim 11, furthermore comprising:

activating an initial network access policy;

transmitting to an evaluation server to determine the security status one or more of the current configuration of the vehicle, the log data of the vehicle, and the elapsed time from a relevant software update; and transmitting the determined security status.

13. The method of claim 12, further comprising determining a security status both locally and remotely.

14. The method of claim 11, wherein the basis for the security self-evaluation is one or more of:

a vehicle identification, information about the vehicle comprising one or more of a manufacturer, construction series, chassis number, and vehicle identification number, software status of a the vehicle, whether current software updates have been installed, and whether critical security updates have been installed.

15. The method of claim 14, wherein the basis for the security self-evaluation further comprises a vehicle authentication.

* * * * *